(12) United States Patent
Matsuda

(10) Patent No.: US 7,949,202 B2
(45) Date of Patent: May 24, 2011

(54) IMAGE PROCESSING SYSTEM, PROJECTOR, AND IMAGE PROCESSING METHOD

(75) Inventor: Hideki Matsuda, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1189 days.

(21) Appl. No.: 11/350,885

(22) Filed: Feb. 10, 2006

(65) Prior Publication Data

US 2006/0181687 A1 Aug. 17, 2006

(30) Foreign Application Priority Data

Feb. 14, 2005 (JP) ................................. 2005-036171

(51) Int. Cl.
*G06K 9/40* (2006.01)
*G03B 21/14* (2006.01)
(52) U.S. Cl. ........................... 382/275; 382/274; 353/69
(58) Field of Classification Search ........................ None
See application file for complete search history.

(56) References Cited

U.S. PATENT DOCUMENTS

| 5,030,986 | A | * | 7/1991 | Dwyer, III | 355/20 |
| 5,091,773 | A | * | 2/1992 | Fouche et al. | 348/806 |
| 5,345,262 | A | * | 9/1994 | Yee et al. | 348/177 |
| 5,357,308 | A | * | 10/1994 | Goo | 396/78 |
| 5,369,450 | A | * | 11/1994 | Haseltine et al. | 348/745 |
| 5,446,548 | A | * | 8/1995 | Gerig et al. | 356/620 |
| 5,631,979 | A | * | 5/1997 | Cok | 382/263 |
| 5,883,476 | A | * | 3/1999 | Noguchi et al. | 315/368.12 |
| 6,072,912 | A | * | 6/2000 | Orito | 382/274 |
| 6,219,011 | B1 | * | 4/2001 | Aloni et al. | 345/1.3 |
| 6,456,339 | B1 | * | 9/2002 | Surati et al. | 348/745 |
| 6,588,904 | B2 | * | 7/2003 | Morton et al. | 352/228 |
| 6,788,210 | B1 | * | 9/2004 | Huang et al. | 340/612 |
| 6,847,356 | B1 | * | 1/2005 | Hasegawa et al. | 345/176 |
| 6,857,746 | B2 | * | 2/2005 | Dyner | 353/28 |
| 7,085,430 | B2 | * | 8/2006 | Winsor et al. | 382/275 |
| 7,125,122 | B2 | * | 10/2006 | Li et al. | 353/31 |
| 7,133,083 | B2 | * | 11/2006 | Jaynes et al. | 348/745 |
| 7,145,699 | B2 | * | 12/2006 | Dolan | 358/452 |

(Continued)

FOREIGN PATENT DOCUMENTS

CN 1460917 A 12/2003

(Continued)

OTHER PUBLICATIONS

U.S. Appl. No. 10/438,849, filed May 16, 2003, Hideki Matsuda et al.

(Continued)

*Primary Examiner* — Vikkram Bali
*Assistant Examiner* — Michelle Entezari
(74) *Attorney, Agent, or Firm* — Oliff & Berridge, PLC

(57) ABSTRACT

A projector including: a sensing section which senses an area including at least a part of a projection image projected onto a projection target area to generate sensing information; a projection target area information generation section which generates projection target area information based on the sensing information; a projection area information generation section which generates projection area information based on the sensing information; an image distortion correction section which corrects distortion of the projection image and generates correction information indicating a degree of the correction; a display area information generation section which generates display area information based on the projection area information and the correction information; and an environmental influence reduction section which performs processing of reducing environmental influence based on the sensing information and the display area information.

11 Claims, 6 Drawing Sheets

U.S. PATENT DOCUMENTS

| | | | |
|---|---|---|---|
| 7,164,415 B2* | 1/2007 | Ooishi et al. | 345/204 |
| 7,221,792 B2 | 5/2007 | Matsuda et al. | |
| 7,292,252 B2 | 11/2007 | Matsuda | |
| 7,422,331 B2* | 9/2008 | Matsuda | 353/69 |
| 7,561,207 B2* | 7/2009 | Fujii et al. | 348/561 |
| 2002/0024640 A1* | 2/2002 | Ioka | 353/94 |
| 2002/0159072 A1* | 10/2002 | Fujii et al. | 356/601 |
| 2003/0043303 A1* | 3/2003 | Karuta et al. | 348/744 |
| 2003/0090742 A1* | 5/2003 | Fukuda et al. | 358/448 |
| 2003/0122780 A1* | 7/2003 | Hendriks et al. | 345/156 |
| 2003/0206179 A1* | 11/2003 | Deering | 345/589 |
| 2003/0223048 A1* | 12/2003 | Kimura | 353/70 |
| 2004/0021799 A1* | 2/2004 | Matsuda | 348/744 |
| 2004/0036813 A1* | 2/2004 | Matsuda | 348/744 |
| 2004/0240748 A1* | 12/2004 | Matsuda | 382/274 |
| 2005/0041216 A1* | 2/2005 | Kobayashi | 353/69 |
| 2005/0094110 A1* | 5/2005 | Nakamura | 353/85 |

FOREIGN PATENT DOCUMENTS

| | | |
|---|---|---|
| CN | 1460919 A | 12/2003 |
| JP | A 2003-339056 | 11/2003 |
| JP | A 2004-48694 | 2/2004 |
| JP | A 2005-341139 | 12/2005 |

OTHER PUBLICATIONS

U.S. Appl. No. 10/438,897, filed May 16, 2003, Hideki Matsuda.
U.S. Appl. No. 11/137,350, filed May 26, 2005, Hideki Matsuda et al.

* cited by examiner

IMAGE PROCESSING SYSTEM, PROJECTOR, AND IMAGE PROCESSING METHOD

Japanese Patent Application No. 2005-36171, filed on Feb. 14, 2005, is hereby incorporated by reference in its entirety.

BACKGROUND OF THE INVENTION

The present invention relates to an image processing system which performs projection image distortion correction processing and environmental influence reduction processing, a projector, and an image processing method.

In recent years, a projector has been proposed which corrects distortion of a projection image and reduces environmental influence (e.g. influence of external light or influence of screen color) by projecting an image onto a screen using a projector including a sensor, sensing the projected image using the sensor, and performing image processing.

In a related-art projector, a sensor for correcting distortion of the projection image and a sensor for reducing the environmental influence are separately provided (e.g. "EMP-835" manufactured by Seiko Epson Corporation), or the projection image distortion correction processing and the environmental influence reduction processing are separately performed.

Therefore, a related-art projector takes time for the projection image distortion correction processing and the environmental influence reduction processing.

In order to reduce the time required for such calibration processing, JP-A-2003-339056 reduces the time required for the environmental influence reduction processing by causing a projector to generate visual environment estimation data to reduce the number of times the calibration image is projected.

However, when distortion of the projection image has been corrected, the projection image may not be displayed in the area in which the projection image is originally displayed due to distortion correction. In this case, even if the environmental influence reduction processing is performed by using sensing information of that area, the environmental influence may not be appropriately reduced from the projection image after distortion correction.

For example, JP-A-2004-48694 discloses a projector which determines the visual environment of the projection area based on sensing information of the selected projection area and corrects an image in order to project an image in an area without an obstacle.

However, since the projector disclosed in JP-A-2004-48694 does not include means for determining the position and the shape of the projection image after distortion correction, the environmental influence may not be appropriately reduced.

The position and the shape of the projection image may change due to a zoom function. A projector must appropriately perform the environmental influence reduction processing even in such a case.

SUMMARY

According to a first aspect of the invention, there is provided an image processing system, comprising:
 a sensing section which senses an area including at least a part of a projection image projected onto a projection target area to generate sensing information;
 a projection area information generation section which generates projection area information indicating a position of the projection image in a sensing area of the sensing section based on the sensing information;
 an image distortion correction section which corrects distortion of the projection image and generates correction information indicating a degree of the correction; a display area information generation section which generates display area information indicating a display area of the projection image in the sensing area after distortion correction based on the projection area information and the correction information; and
 an environmental influence reduction section which performs processing of reducing environmental influence caused by a difference between an ideal environment and an actual environment by using information inside the display area included in the sensing information based on the sensing information and the display area information.

According to a second aspect of the invention, there is provided an image processing system, comprising:
 a sensing section which senses an area including at least a part of a projection image projected onto a projection target area to generate sensing information;
 a projection area information generation section which generates projection area information indicating a position of the projection image in a sensing area of the sensing section based on the sensing information;
 an image distortion correction section which corrects distortion of the projection image and generates correction information indicating a degree of the correction;
 an environmental influence reduction section which performs processing of reducing environmental influence caused by a difference between an ideal environment and an actual environment;
 a projection section which projects a single-color red image, a single-color green image, a single-color blue image, a solid black image, and a multi-color image including one of red, green, and blue and black as the projection image at different times; and
 a differential image generation section which generates a differential image based on sensing information of the multi-color image and sensing information of one of the single-color red image, the single-color green image, the single-color blue image, and the solid black image,
 wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;
 wherein the projection area information generation section generates center area information indicating a position of the center image in the sensing area and peripheral area information indicating a position of the peripheral image in the sensing area based on the differential image, and generates the projection area information based on the center area information and the peripheral area information; and
 wherein the environmental influence reduction section performs the processing of reducing the environmental influence by using information inside the center image included in the sensing information in a state in which the distortion is corrected based on the sensing information, the correction information, and the center area information.

According to a third aspect of the invention, there is provided a projector comprising any one of the above-described image processing systems.

According to a fourth aspect, of the invention, there is provided a program readable by a computer including a sensing section, the program causing the computer to function as:

a sensing control section which causes the sensing section to sense an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

a display area information generation section which generates display area information indicating a display area of the projection image in the sensing area after distortion correction based on the projection area information and the correction information; and an environmental influence reduction section which performs processing of reducing environmental influence caused by a difference between an ideal environment and an actual environment by using information inside the display area included in the sensing information based on the sensing information and the display area information.

According to a fifth aspect of the invention, there is provided a program readable by a computer including a sensing section and a projection section, the program causing the computer to function as:

a sensing control section which causes the sensing section to sense an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

an environmental influence reduction section which performs processing of reducing environmental influence caused by a difference between an ideal environment and an actual environment;

a projection control section which causes the projection section to project a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of one of the single-color red image, the single-color green image, the single-color blue image, and the solid black image, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

wherein the projection area information generation section generates center area information indicating a position of the center image in the sensing area and peripheral area information indicating a position of the peripheral image in the sensing area based on the differential image, and generates the projection area information based on the center area information and the peripheral area information; and wherein the environmental influence reduction section performs the processing of reducing the environmental influence by using information inside the center image included in the sensing information in a state in which the distortion is corrected based on the sensing information, the correction information, and the center area information.

According to a sixth aspect of the invention, there is provided an information storage medium storing any one of the above-described programs.

According to a seventh aspect of the invention, there is provided an image processing method utilizing a computer including a sensing section and a processing section, wherein the sensing section senses an area including at least a part of a projection image projected onto a projection target area to generate sensing information;

wherein the processing section generates projection area information indicating a position of the projection image in a sensing area of the sensing section based on the sensing information;

wherein the processing section corrects distortion of the projection image and generates correction information indicating a degree of the correction;

wherein the processing section generates display area information indicating a display area of the projection image in the sensing area after distortion correction based on the projection area information and the correction information; and wherein the processing section performs processing of reducing environmental influence caused by a difference between an ideal environment and an actual environment by using information inside the display area included in the sensing information based on the sensing information and the display area information.

According to an eighth aspect of the invention, there is provided an image processing method utilizing a computer including a sensing section, a processing section, and a projection section, wherein the projection section projects a single-color red image, a single-color green image, a single-color blue image, a solid black image, and a multi-color image including one of red, green, and blue and black as the projection image at different times;

wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

wherein the sensing section senses an area including at least a part of a projection image projected onto a projection target area to generate sensing information;

wherein the processing section generates a differential image based on sensing information of the multi-color image and sensing information of one of the single-color red image, the single-color green image, the single-color blue image, and the solid black image, wherein the processing section generates center area information indicating a position of the center image in the sensing area and peripheral area information indicating a position of the peripheral image in the sensing area based on the differential image, and generates projection area information indicating a position of the projection image in the sensing area based on the center area information and the peripheral area information;

wherein the processing section corrects distortion of the projection image and generates correction information indicating a degree of the correction; and wherein the processing section performs processing of reducing environmental influence caused by a difference between an ideal environment and an actual environment by using information inside the center image included in the sensing information in a state in which the distortion is corrected based on the sensing information, the correction information, and the center area information.

DETAILED DESCRIPTION OF THE EMBODIMENT

Figure 1:
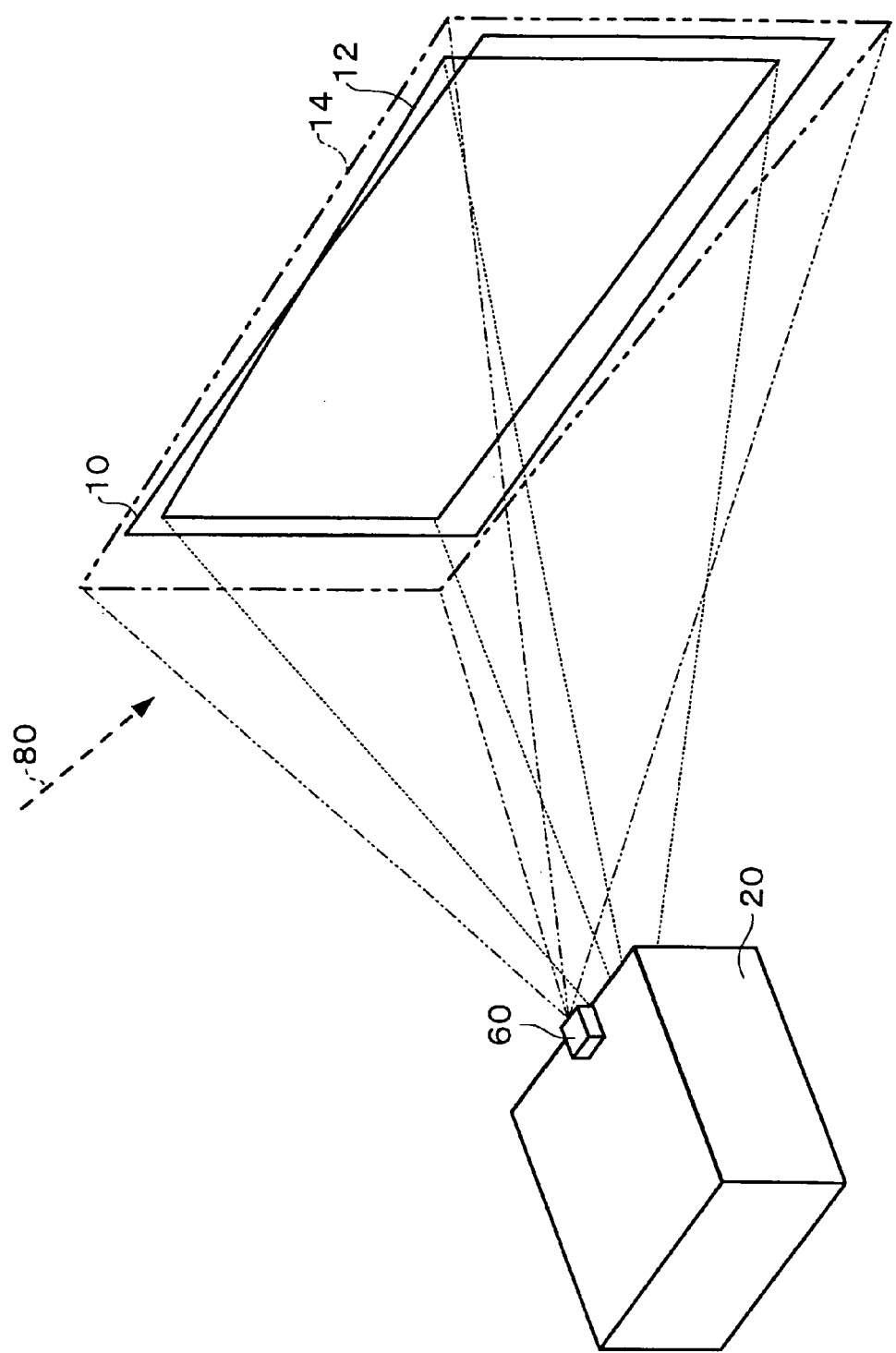
FIG. 1 is a schematic diagram showing an image projection state according to a first embodiment.

The invention may provide an image processing system, a projector, a program, an information storage medium, and an image processing method capable of more appropriately performing environmental influence reduction processing when performing projection image distortion correction processing.

According to one embodiment of the invention, there is provided an image processing system, comprising:

a sensing section which senses an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

a display area information generation section which generates display area information indicating a display area of the projection image in the sensing area after distortion correction based on the projection area information and the correction information; and an environmental influence reduction section which performs processing of reducing environmental influence caused by a difference between an ideal environment and an actual environment by using information inside the display area included in the sensing information based on the sensing information and the display area information.

According to one embodiment of the invention, there is provided a projector comprising the above-described image processing system.

According to one embodiment of the invention, there is provided a program readable by a computer including a sensing section, the program causing the computer to function as:

a sensing control section which causes the sensing section to sense an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

a display area information generation section which generates display area information indicating a display area of the projection image in the sensing area after distortion correction based on the projection area information and the correction information; and an environmental influence reduction section which performs processing of reducing environmental influence caused by a difference between an ideal environment and an actual environment by using information inside the display area included in the sensing information based on the sensing information and the display area information.

According to one embodiment of the invention, there is provided an information storage medium storing the above-described program.

According to one embodiment of the invention, there is provided an image processing method utilizing a computer including a sensing section and a processing section, wherein the sensing section senses an area including at least a part of a projection image projected onto a projection target area to generate sensing information;

wherein the processing section generates projection area information indicating a position of the projection image in a sensing area of the sensing section based on the sensing information;

wherein the processing section corrects distortion of the projection image and generates correction information indicating a degree of the correction;

wherein the processing section generates display area information indicating a display area of the projection image in the sensing area after distortion correction based on the projection area information and the correction information; and wherein the processing section performs processing of reducing environmental influence caused by a difference between an ideal environment and an actual environment by using information inside the display area included in the sensing information based on the sensing information and the display area information.

According to these embodiments, the image processing system and the like can more appropriately perform the environmental influence reduction processing when performing the projection image distortion correction processing by performing the environmental influence reduction processing using the sensing information inside the display area after distortion correction.

According to one embodiment of the invention, there is provided an image processing system, comprising:

a sensing section which senses an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

an environmental influence reduction section which performs processing of reducing environmental influence caused by a difference between an ideal environment and an actual environment;

a projection section which projects a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of one of the single-color red image, the single-color green image, the single-color blue image, and the solid black image, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

wherein the projection area information generation section generates center area information indicating a position of the center image in the sensing area and peripheral area information indicating a position of the peripheral image in the sensing area based on the differential image, and generates the projection area information based on the center area information and the peripheral area information; and wherein the environmental influence reduction section performs the processing of reducing the environmental influence by using information inside the center image included in the sensing information in a state in which the distortion is corrected based on the sensing information, the correction information, and the center area information.

According to one embodiment of the invention, there is provided a projector comprising the above-described image processing system.

According to one embodiment of the invention, there is provided a program readable by a computer including a sensing section and a projection section, the program causing the computer to function as:

a sensing control section which causes the sensing section to sense an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

an environmental influence reduction section which performs processing of reducing environmental influence caused by a difference between an ideal environment and an actual environment;

a projection control section which causes the projection section to project a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of one of the single-color red image, the single-color green image, the single-color blue image, and the solid black image, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

wherein the projection area information generation section generates center area information indicating a position of the center image in the sensing area and peripheral area information indicating a position of the peripheral image in the sensing area based on the differential image, and generates the projection area information based on the center area information and the peripheral area information; and wherein the environmental influence reduction section performs the processing of reducing the environmental influence by using information inside the center image included in the sensing information in a state in which the distortion is corrected based on the sensing information, the correction information, and the center area information.

According to one embodiment of the invention, there is provided an information storage medium storing the above-described program.

According to one embodiment of the invention, there is provided an image processing method utilizing a computer including a sensing section, a processing section, and a projection section, wherein the projection section projects a single-color red image, a single-color green image, a single-color blue image, a solid black image, and a multi-color image including one of red, green, and blue and black as the projection image at different times;

wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

the sensing section senses an area including at least a part of a projection image projected onto a projection target area to generate sensing information;

wherein the processing section generates a differential image based on sensing information of the multi-color image and sensing information of one of the single-color red image, the single-color green image, the single-color blue image, and the solid black image, wherein the processing section generates center area information indicating a position of the center image in the sensing area and peripheral area information indicating a position of the peripheral image in the sensing area based on the differential image, and generates projection area information indicating a position of the projection image in the sensing area based on the center area information and the peripheral area information;

wherein the processing section corrects distortion of the projection image and generates correction information indicating a degree of the correction; and wherein the processing section performs processing of reducing environmental influence caused by a difference between an ideal environment and an actual environment by using information inside the center image included in the sensing information in a state in which the distortion is corrected based on the sensing information, the correction information, and the center area information.

According to these embodiments, the image processing system and the like can more appropriately perform the environmental influence reduction processing when performing the projection image distortion correction processing by performing the environmental influence reduction processing using the sensing information inside the center area after distortion correction.

Each of the above-described image processing systems, projectors, programs, and information storage media may comprise:

a control section which controls a zoom section which adjusts a size of the projection image based on the display area information so that the projection image is projected in an area corresponding to the display area inside the projection target area at an optimum size, and generates adjustment information indicating a degree of the adjustment, wherein the environmental influence reduction section includes:

a sensing information correction section which generates corrected sensing information by determining a change in brightness of the projection image due to the adjustment based on the adjustment information, and correcting information inside the display area included in the sensing information based on the change in brightness; and an image information correction section which corrects image information based on the corrected sensing information so that a color and brightness of the projection image become ideal.

This enables the image processing system and the like to more appropriately perform the environmental influence reduction processing when adjusting the size of the projection image by performing the environmental influence reduction processing using the sensing information inside the display area after size adjustment.

In each of the above-described image processing systems, projectors, programs, information storage media, and image processing methods, the image information correction section may include:

a color correction section which corrects the image information based on ideal color information indicating an ideal color and the corrected sensing information so that the projection image is projected in the ideal color; and a brightness correction section which corrects the image information corrected by the color correction section based on ideal brightness information indicating ideal brightness, the corrected sensing information, and the display area information so that the projection image is projected at the ideal brightness.

This enables the image processing system and the like to generate an appropriate image of which the color and brightness have been adjusted.

Each of the above-described image processing systems, projectors, programs, information storage media, and image processing methods may comprise:

a projection section which projects a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of the single-color image of red, green, blue, or black, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black; and wherein the projection area information generation section generates center area information indicating a position of the center image in the sensing area and peripheral area information indicating a position of the peripheral image in the sensing area based on the differential image, and generates the projection area information based on the center area information and the peripheral area information.

This enables the image processing system and the like to perform the projection image distortion correction processing and the environmental influence reduction processing by projecting and sensing five types of images, whereby image processing can be more efficiently performed.

In each of the above-described image processing systems, projectors, programs, information storage media, and image processing methods, the sensing information correction section may generate corrected sensing information of the single-color red image, the single-color green image, the single-color blue image, and the solid black image based on the sensing information of the single-color red image, the single-color green image, the single-color blue image, and the solid black image;

the color correction section may correct the image information based on the corrected sensing information of the single-color red image, the single-color green image, the single-color blue image, and the solid black image; and the brightness correction section may generate corrected sensing information of a solid white image based on the corrected sensing information of the single-color red image, the single-color green image, the single-color blue image, and the single-color black image, and correct the image information corrected by the color correction section by utilizing the corrected sensing information of the solid white image.

This enables the image processing system and the like to perform the projection image distortion correction processing and the environmental influence reduction processing by projecting and sensing five types of images by generating the corrected sensing information of the solid white image based on the corrected sensing information of the single-color red image, the single-color green image, the single-color blue image, and the single-color black image, so that the image processing can be more efficiently performed.

In each of the above-described image processing systems, projectors, programs, information storage media, and image processing methods, the sensing information correction section may calculate an average value of image signal values of all pixels forming the display area included in the sensing information for each type of the image signal values for the sensing information of each of the single-color red image, the single-color green image, the single-color blue image, and the solid black image, and correct the average value of each type of the image signal values based on the change in brightness to generate information indicating the average value after correction as the corrected sensing information.

This enables the image processing system and the like to more efficiently perform image processing by calculating the average value of the image signal values of all the pixels in the display area.

In each of the above-described image processing systems, projectors, programs information storage media, and image processing methods, the projection section may project an image having an area corresponding to the multi-color image or the center image before projecting the projection image as a position confirmation image for allowing a user to confirm whether or not the area corresponding to the center image is projected onto the projection target area.

This enables the image processing system and the like to sense an image in a state in which the center image is reliably included in the sensing information by using the position confirmation image and allowing the user to confirm whether or not the area corresponding to the center image is positioned inside the projection target area. This enables the image processing system and the like to perform image processing by using appropriate sensing information.

The image processing system, the projector, the program, the information storage medium, and the image processing method may include a projection target area information generation section which generates projection target area information indicating a position of the projection target area in the sensing area based on the sensing information, and the image distortion correction section may correct distortion of the projection image based on the projection target area information and the projection area information.

In the image processing system, the projector, the program, the information storage medium, and the image processing method, the image distortion correction section may detect a peak position of a brightness index value (e.g. luminance value or illuminance value) in the projection area based on the sensing information and the projection area information, and may correct distortion of the projection image based on the peak position.

Embodiments of the invention applied to a projector having an image processing system are described below by way of example, with reference to the accompanying drawings. Note that the embodiments described below do not in any way limit the scope of the invention laid out in the claims herein. In addition, not all of the elements of the embodiments described below should be taken as essential requirements of the invention.

First Embodiment

As a first embodiment, image processing using sensing information in a display area after image distortion correction is described below.

FIG. 1 is a schematic diagram showing an image projection state according to the first embodiment.

A projector 20 projects an image onto a screen 10 having a projection target area. As a result, a projection image 12 is displayed on the screen 10.

In the first embodiment, a part of the screen 10 is influenced by external light 80 (environmental influence), as shown in FIG. 1. Since the projector 20 obliquely projects an image onto the screen 10, the projection image 12 is distorted so that keystone distortion occurs. As shown in FIG. 1, a part of the projection image 12 is positioned outside the screen 10.

In the first embodiment, distortion correction processing of the projection image 12 and environmental influence reduction processing are performed almost at the same time by providing a sensor 60 in the projector 20, causing the sensor 60 to sense a sensing area 14 including the projection image 12 projected onto the screen 10 (may be a part of the projection image 12), and causing the projector 20 to perform image processing based on sensing information.

Functional blocks of the projector 20 for implementing such a function are described below.

Figure 2:
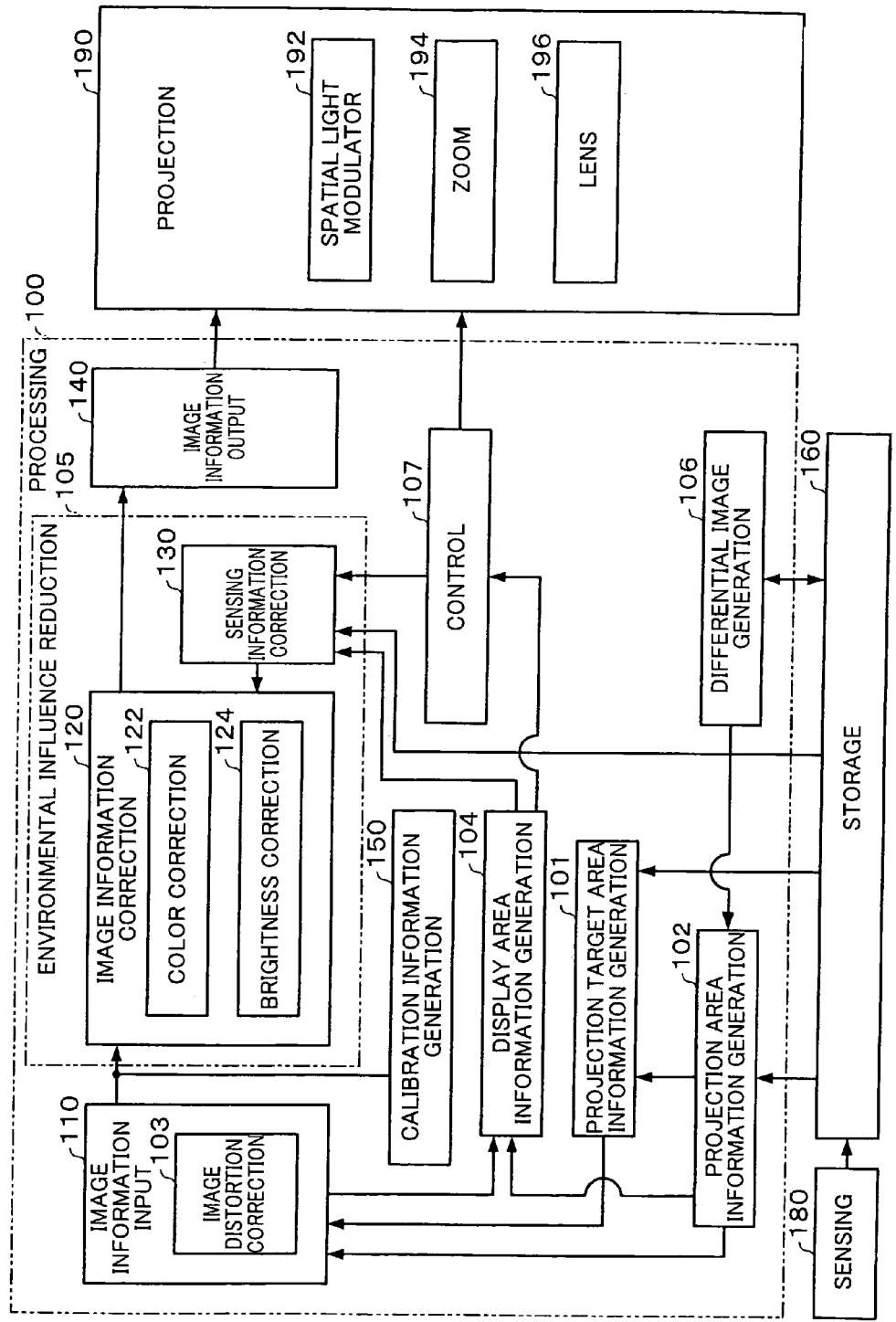
FIG. 2 is a functional block diagram of a projector according to the first embodiment.

FIG. 2 is a functional block diagram of the projector 20 according to the first embodiment.

The projector 20 includes a sensing section 180 which senses the projection image 12 projected onto the screen 10 to generate sensing information, a storage section 140 which stores the sensing information, a processing section 100 which performs image processing based on the sensing information, and a projection section 190 which projects an image based on image information from the processing section 100. The sensing section 180 includes the sensor 60.

The processing section 100 includes a projection target area information generation section 101 which generates projection target area information indicating the position of the screen 10 in the sensing area of the sensing section 180 based on the sensing information, a projection area information generation section 102 which generates projection area information indicating the position of the projection image 12 in the sensing area based on the sensing information, an image distortion correction section 103 which corrects distortion of the projection image 12 based on the projection target area information and the projection area information, and generates correction information indicating the degree of correction, a display area information generation section 104 which generates display area information indicating the display area of the projection image 12 in the sensing area after distortion correction based on the projection area information and the correction information, and an environmental influence reduction section 105 which performs processing of reducing environmental influence caused by the difference between an ideal environment and an actual environment using information inside the display area included in the sensing information based on the sensing information and the display area information.

The processing section 100 includes an image information input section 110 which outputs image information (e.g. digital RGB signal) input from a PC or the like to the environmental influence reduction section 105 and includes the image distortion correction section 103, an image information output section 140 which outputs the image information from the environmental influence reduction section 105 to the projection section 190, a calibration information generation section 150 which generates calibration information for projecting the calibration projection image 12, and a differential image generation section 106 which generates a differential image based on a plurality of types of sensing information stored in the storage section 160.

The projector 20 has a zoom function for adjusting the size of the projection image 12. Therefore, the projection section 190 includes a zoom section 194 for adjusting the size of the projection image 12 in addition to a spatial light modulator 192 and a lens 196. The processing section 100 includes a control section 107 which controls the zoom section 194 and generates adjustment information indicating the degree of adjustment.

The environmental influence reduction section 105 includes a sensing information correction section 130 which generates corrected sensing information by determining a change in brightness of the projection image 12 due to adjustment based on the adjustment information from the control section 107 and correcting the information inside the display area included in the sensing information corresponding to the change in brightness, and an image information correction section 120 which corrects the image information based on the corrected sensing information so that the color and the brightness of the projection image 12 become ideal.

The image information correction section 120 includes a color correction section 122 which corrects the image information based on ideal color information indicating an ideal color and the corrected sensing information so that the projection image 12 is projected in the ideal color, and a brightness correction section 124 which corrects the image information corrected by the color correction section 122 based on ideal brightness information indicating ideal brightness and the corrected sensing information so that the projection image 12 is projected at the ideal brightness. Note that the brightness correction of the brightness correction section 124 includes grayscale correction which corrects the image information so that the projection image 12 is projected at an ideal grayscale in a state in which the projection image 12 is subjected to environmental influence.

As hardware for implementing the function of each section of the projector 20, the following hardware may be applied, for example.

Figure 3:
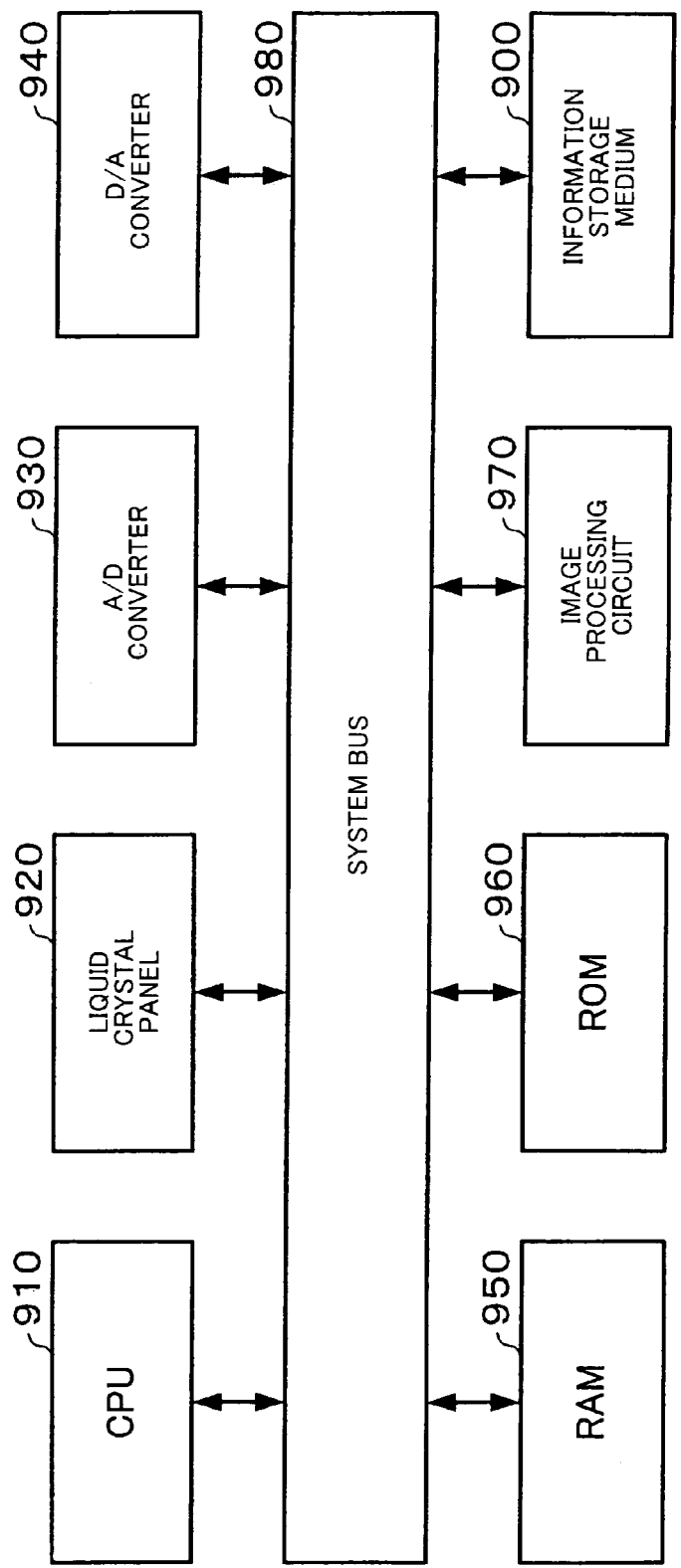
FIG. 3 is a hardware block diagram of the projector according to the first embodiment.

FIG. 3 is a hardware block diagram of the projector 20 according to the first embodiment.

For example, the image information input section 110 may be implemented by using an A/D converter 930, an image processing circuit 970, or the like, the storage section 160 may be implemented by using a RAM 950 or the like, the projection target area information generation section 101, the projection area information generation section 102, and the differential image generation section 106 may be implemented by using the image processing circuit 970 or the like, the image distortion correction section 103, the display area information generation section 104, the control section 107, and the sensing information correction section 130 may be implemented by using a CPU 910 or the like, the calibration information generation section 150 may be implemented by using the image processing circuit 970, the RAM 950, or the like, the image information output section 140 may be implemented by using a D/A converter 940 or the like, the spatial light modulator 192 may be implemented by using a liquid crystal panel 920 or the like, the color correction section 122 may be implemented by using a ROM 960 which stores the ideal color information, the RAM 950 which stores a color correction three-dimensional lookup table (3D-LUT), the image processing circuit 970 which corrects the 3D-LUT, or the like, and the brightness correction section 124 may be implemented by using the ROM 960 which stores the ideal brightness information, the RAM 950 which stores a brightness correction one-dimensional lookup table (1D-LUT), the image processing circuit 970 which corrects the 1D-LUT, or the like.

The sensing section 180 may be implemented by using a CCD camera, a CMOS camera, or the like.

These sections can exchange information through a system bus 980.

These sections may be implemented by hardware such as a circuit, or may be implemented by software such as a driver.

The function of the image distortion correction section 103 or the like may be implemented by a computer by causing the computer to read a program for causing the computer to function as the image distortion correction section 103 or the like from an information storage medium 900 which stores the program.

As the information storage medium 900, a CD-ROM, DVD-ROM, ROM, RAM, HDD, or the like may be applied. The program read method may be a contact method or a noncontact method.

The above-described functions may be implemented by downloading a program or the like for implementing the above-described functions from a host device or the like through a transmission line instead of reading the program from the information storage medium 900.

The image processing using the above-described sections is described below.

Figure 4:
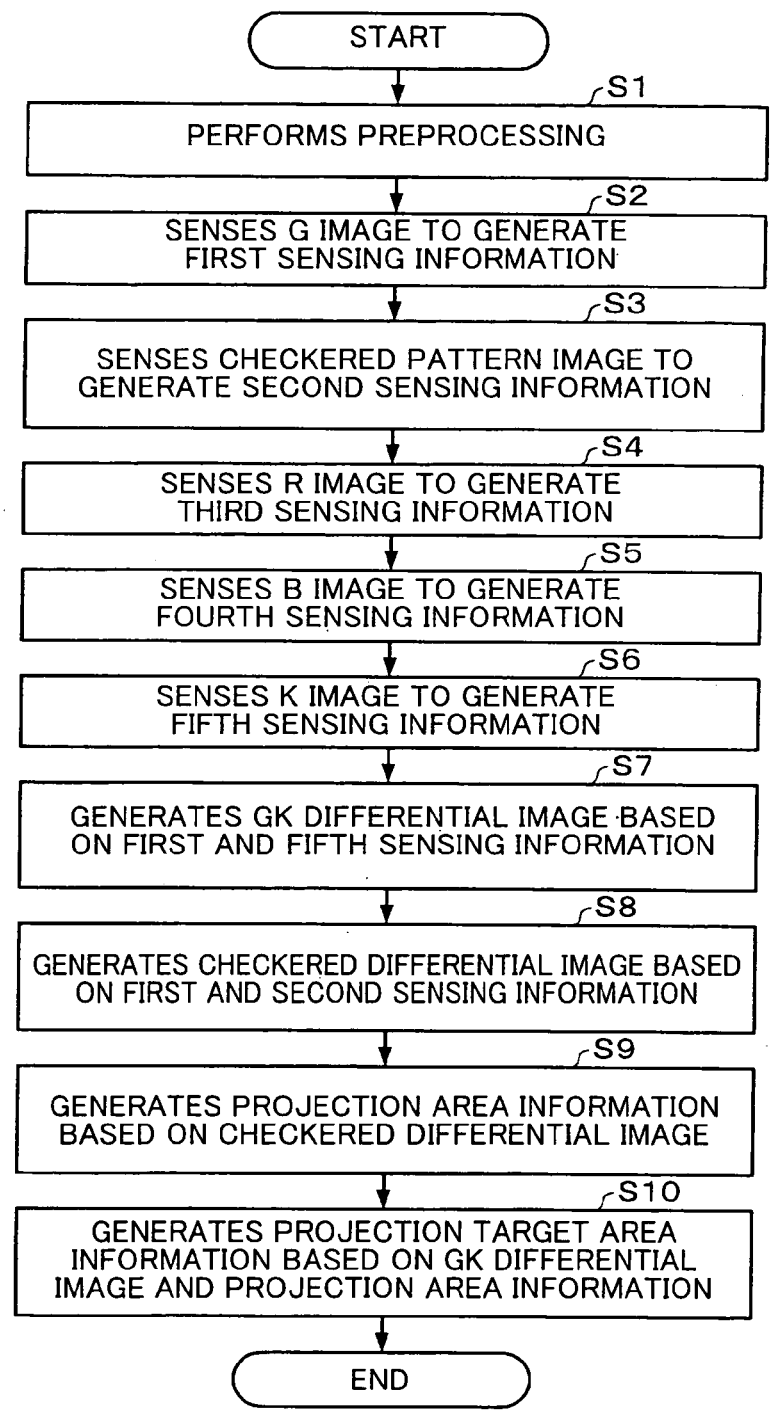
FIG. 4 is a flowchart showing the flow of image processing from preprocessing to generation of projection target area information according to the first embodiment.

FIG. 4 is a flowchart showing the flow of image processing from preprocessing to generation of the projection target area information according to the first embodiment.

The projector 20 performs preprocessing (step S1). In more detail, when the user has activated the projector 20, the control section 107 controls the zoom section 194 so that the zoom state is set in an initial state. The calibration information generation section 150 generates position confirmation image calibration information, and the projection section 190 projects a position confirmation image based on the calibration information input through the environmental influence reduction section 105 and the image information output section 140. As the position confirmation image, an image having a center area formed by equally dividing the entire image into nine areas, a checkered pattern image described later, or the like may be used. The projector 20 allows the user to confirm whether or not the center area of the position confirmation image is projected onto the screen 10. When the center area of the position confirmation image is not projected onto the screen 10, the projector 20 allows the user to adjust the position of the projector 20 or the like so that the center area is reliably projected onto the screen 10.

When the user presses a correction button provided in the projector 20 after completion of the preprocessing, the projector 20 performs the distortion correction processing of the projection image 12 and the environmental influence reduction processing.

The calibration information generation section 150 generates calibration information for projecting a single-color image of which the entire image is green (G image). The projection section 190 projects the G image based on the calibration information.

The sensing section 180 senses the sensing area 14 in a state in which the G image is projected onto the screen 10 at an automatic exposure to generate first sensing information (step S2). The storage section 160 stores the first sensing information.

The calibration information generation section 150 generates calibration information for projecting a multi-color image of which the entire image is in a checkered pattern made up of green and black (checkered pattern image).

Figure 5:
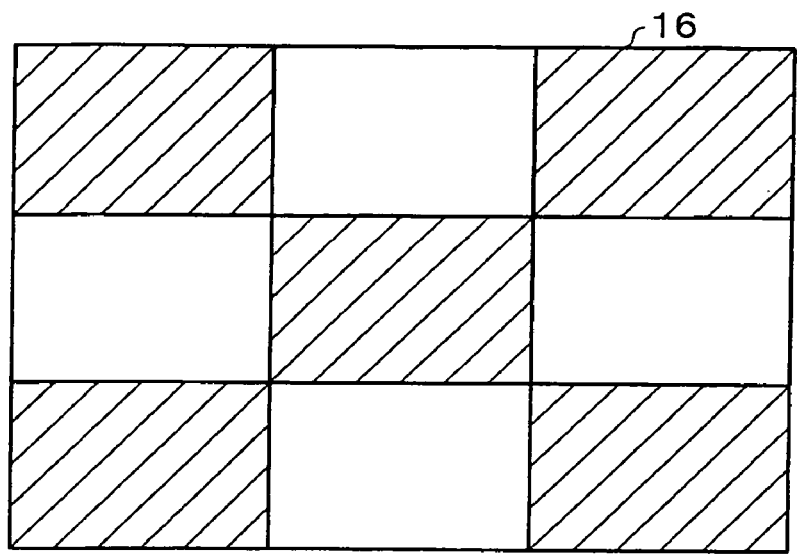
FIG. 5 shows a checkered pattern image according to the first embodiment.

FIG. 5 is a diagram showing a checkered pattern image 16 according to the first embodiment.

The checkered pattern image 16 is equally divided into nine areas, in which the center image and four peripheral images at the four corners are black and the remaining four background images are green.

The projection section 190 projects the checkered pattern image 16 based on the calibration information for the checkered pattern image 16.

The sensing section 180 senses the sensing area 14 in a state in which the checkered pattern image 16 is projected onto the screen 10 at the exposure used when sensing the G image to generate second sensing information (step S3). The storage section 160 stores the second sensing information.

The calibration information generation section 150 generates calibration information for projecting a single-color image of which the entire image is red (R image). The projection section 190 projects the R image based on the calibration information.

The sensing section 180 senses the sensing area 14 in a state in which the R image is projected onto the screen 10 at the exposure used when sensing the G image to generate third sensing information (step S4). The storage section 160 stores the third sensing information.

The calibration information generation section 150 generates calibration information for projecting a single-color image of which the entire image is blue (B image). The projection section 190 projects the B image based on the calibration information.

The sensing section 180 senses the sensing area 14 in a state in which the B image is projected onto the screen 10 at the exposure used when sensing the G image to generate fourth sensing information (step S5). The storage section 160 stores the fourth sensing information.

The calibration information generation section 150 generates calibration information for projecting a single-color image of which the entire image is black (K image). The projection section 190 projects the K image based on the calibration information.

The sensing section 180 senses the sensing area 14 in a state in which the K image is projected onto the screen 10 at the exposure used when sensing the G image to generate fifth sensing information (step S6). The storage section 160 stores the fifth sensing information.

The differential image generation section 106 generates a differential image (GK differential image) between the sensing image of the G image indicated by the first sensing information and the sensing image of the K image indicated by the fifth sensing information (step S7). The storage section 160 stores information on the GK differential image.

The differential image generation section 106 generates a differential image (checkered differential image) between the sensing image of the G image indicated by the first sensing information and the sensing image of the checkered pattern image 16 indicated by the second sensing information (step S8). The storage section 160 stores information on the checkered differential image.

The projection area information generation section 102 generates center area information indicating the position of the area of the center image (center area) in the sensing area of the sensor 60 and peripheral area information indicating the positions of the areas of the peripheral images (peripheral areas) in the sensing area based on the information on the checkered differential image, and generates projection area information indicating the position of the projection image 12 (projection area) in the sensing area based on the center area information and the peripheral area information (step S9).

In more detail, the projection area information generation section 102 detects center reference positions of the center area and peripheral reference positions of the peripheral areas included in the checkered differential image by determining a point at which the value (differential value) of each pixel changes in the checkered differential image, for example. The projection area information generation section 102 determines the positions of the four corners of the center area based on the reference positions, and determines the positions of the four corners of the projection area based on the positions of the four corners of the center area. The projection area information corresponds to information indicating the positions of the four corners of the projection area in the sensing area, for example.

The projection target area information generation section 101 generates projection target area information indicating the position of the screen 10 in the sensing area based on the information on the GK differential image and the projection area information (step S10).

In more detail, the projection target area information generation section 101 generates the projection target area information determining the boundary line by detecting the edge in the GK differential image from the positions of the four corners of the center area toward the outside based on the projection area information, for example. The projection target area information corresponds to information indicating the positions of the four corners of the screen 10 in the sensing area, for example.

Figure 6:
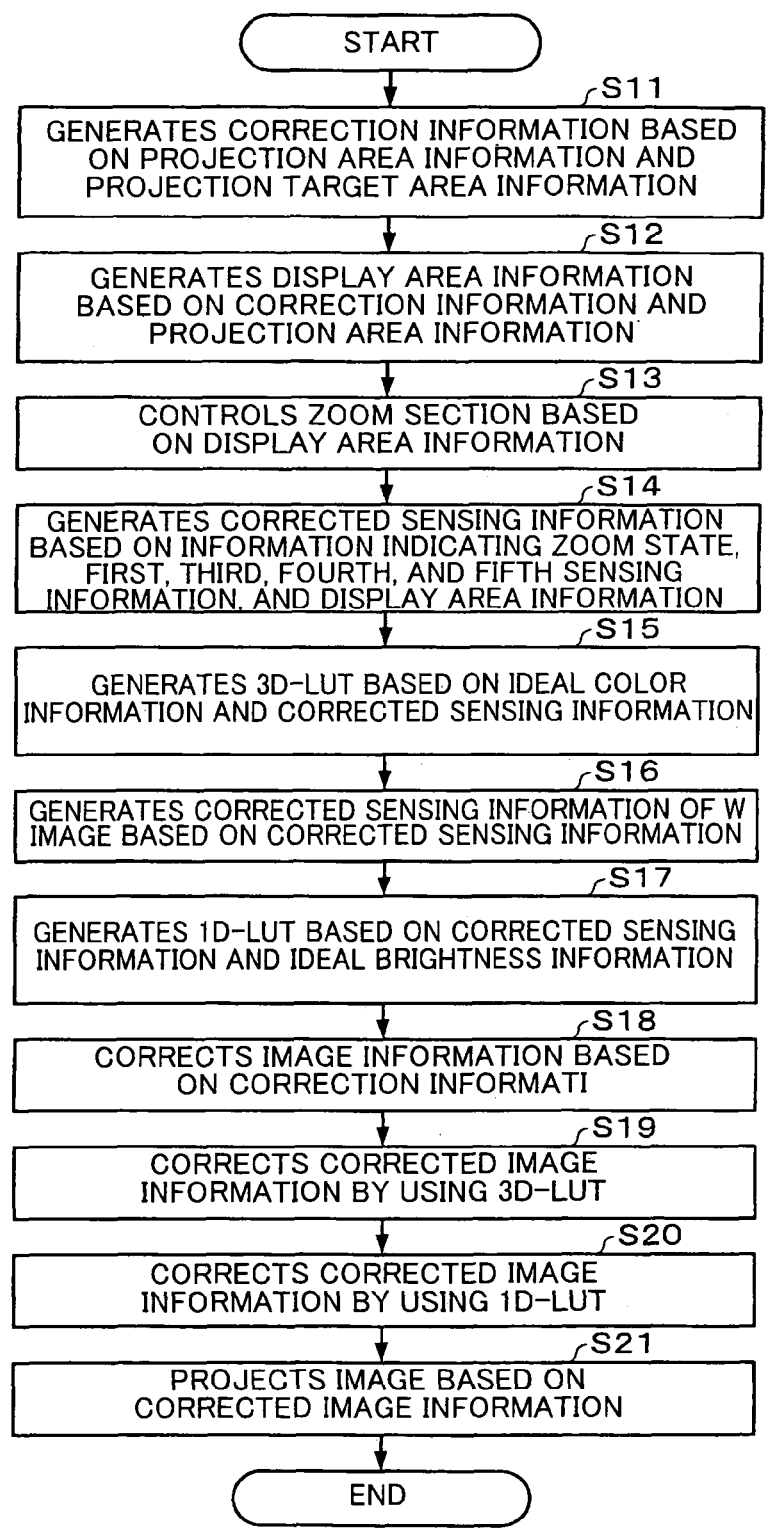
FIG. 6 is a flowchart showing the flow of image processing from generation of correction information to image projection according to the first embodiment.

FIG. 6 is a flowchart showing the flow of image processing from generation of correction information to image projection according to the first embodiment.

The image distortion correction section 103 generates correction information indicating the degree of correction of distortion of the projection image 12 based on the projection area information and the projection target area information (step S11).

The display area information generation section 104 generates display area information indicating the display area of the projection image 12 in the sensing area after distortion correction based on the correction information and the projection area information (step S12).

In more detail, the display area information generation section 104 determines the difference in shape between the projection area and the projection target area based on the projection area information and the projection target area information, and generates the correction information so that distortion of the projection image 12 is corrected according to the difference and the projection image 12 is displayed at a desired aspect ratio (height/width ratio).

As a more detailed processing procedure of the projection target area information generation section 101, the projection area information generation section 102, and the image distortion correction section 103, a method described in JP-A-

2005-341139 may be used, for example. Therefore, description of the detailed processing procedure is omitted.

The control section 107 determines the optimum zoom state after distortion correction based on the display area information, and controls the zoom section 194 so that the optimum zoom state is obtained (step S13).

The sensing information correction section 130 generates corrected sensing information indicating the average value of each of the tristimulus values of all the pixels forming the display area in the optimum zoom state based on the information indicating the initial zoom state and the information indicating the optimum zoom state from the control section 107, the first, third, fourth, and fifth sensing information, and the display area information (step S14).

In more detail, the sensing information correction section 130 generates the corrected sensing information indicating the average value of each of R, G, and B of the sensing information of the R image, the average value of each of R, G, and B of the sensing information of the G image, the average value of each of R, G and B of the sensing information of the B image, and the average value of each of R, G, and B of the sensing information of the K image.

The color correction section 122 generates a 3D-LUT based on the ideal color information indicating the ideal color and the corrected sensing information so that the projection image 12 is projected in the ideal color (step S15).

The brightness correction section 124 generates corrected sensing information of a white image (W image) by calculating the sum of the corrected sensing information of the R image, the corrected sensing information of the G image, and the corrected sensing information of the B image (step S16). In more detail, the brightness correction section 124 generates a value obtained by subtracting the corrected sensing information of the K image twice from the sum of the corrected sensing information of the R image, the corrected sensing information of the G image, and the corrected sensing information of the B image as the corrected sensing information of the W image. The corrected sensing information of the K image is subtracted twice in order to remove the external light component twice from the external light component trebled by the addition of three values.

The brightness correction section 124 generates a 1D-LUT based on the corrected sensing information from the sensing information correction section 130, the corrected sensing information of the W image, and the ideal brightness information indicating the ideal brightness so that the projection image 12 is projected at the ideal brightness (step S17).

The above-described procedure allows the projector 20 to be in a state in which the preparation for correcting the image information has been completed.

When the image information has been input from the PC, the image distortion correction section 103 corrects the image information based on the correction information in order to correct distortion of the projection image 12 (step S18).

The color correction section 122 corrects the image information corrected by the image distortion correction section 103 by using the 3D-LUT in order to correct the color of the projection image 12 (step S19).

The brightness correction section 124 corrects the image information corrected by the color correction section 122 by using the 1D-LUT in order to correct the brightness of the projection image 12 (step S20).

The image information output section 140 outputs the image information subjected to the image distortion correction processing and the environmental influence reduction processing to the projection section 190. The projection section 190 projects an image based on the image information (step S21).

As described above, according to the first embodiment, the projector 20 can more appropriately perform the environmental influence reduction processing when performing the distortion correction processing of the projection image 12 by performing the environmental influence reduction processing using the sensing information inside the display area after distortion correction.

The projector 20 can more appropriately perform the environmental influence reduction processing when adjusting the size of the projection image 12 by performing the environmental influence reduction processing using the sensing information inside the display area after size adjustment by the zoom section 194.

According to the first embodiment, the projector 20 can efficiently perform the image processing by projecting and sensing five types of calibration images including the calibration images for correcting image distortion and the calibration images for correcting the color and the brightness. Specifically, according to the first embodiment, the projector 20 can correct image distortion and correct the color and the brightness taking into consideration the influence of the external light 80 and the color of the screen 10 almost at the same time. This allows the projector 20 to reduce the time required for the calibration processing to provide the user with a high degree of convenience.

According to the first embodiment, the projector 20 can sense an image in a state in which the sensing information of the center image of the checkered pattern image 16 is reliably included in the sensing information by using the position confirmation image and allowing the user to confirm whether or not the area corresponding to the center image is positioned inside the screen 10. Therefore, the projector 20 can perform the image processing by using appropriate sensing information.

According to the first embodiment, the projector 20 can generate the first sensing information at an environment-compliant exposure by initially sensing the G image having the highest luminance value at an automatic exposure setting. The projector 20 can generate the second to fifth sensing information at an exposure suitable for generation of the differential image, generation of the corrected sensing information of the W image, and environmental influence correction (color correction and brightness correction) by generating the second to fifth sensing information at the exposure used when sensing the G image.

According to the first embodiment, since the projector 20 can perform the image distortion correction processing and the environmental influence reduction processing at the same time by using only one sensor 60, the image processing can be efficiently performed by using a more simplified configuration.

Second Embodiment

As a second embodiment, image processing using the sensing information inside the center area after image distortion correction is described below.

In the first embodiment, the sensing information correction section 130 uses the sensing information of the pixels in the entire display area. In the second embodiment, the sensing information correction section 130 uses the sensing information of the pixels in the center area. In this case, the sensing information correction section 130 can determine the positions of the four corners of the center area by using the projection area information from the projection area information generation section 102 instead of the display area information, so that the sensing information inside the center image can be used.

The projector 20 can also use the sensing information of the projection image 12 after distortion correction by using such a method, so that the projector 20 can perform image processing by using appropriate sensing information.

In particular, the projector 20 can sense an image in a state in which the sensing information inside the center image of the checkered pattern image 16 is reliably included in the sensing information by using the position confirmation image and allowing the user to confirm whether or not the area corresponding to the center image is positioned inside the projection target area.

Modification

The preferred embodiments to which the invention is applied are described above. However, the application of the invention is not limited to the above-described embodiments.

In the above-described embodiments, the projector 20 uses the checkered pattern image 16 made up of green and black. However, the projector 20 may use a checkered pattern image made up of a single-color other than green (red or blue) and black, for example. The color pattern of the checkered pattern image 16 may be the reverse of that described in above-described embodiments.

In the above-described embodiments, the projector 20 does not use a solid white image. However, the projector 20 may use a solid white image in addition to the above-described single-color image, and may use a checkered pattern image made up of white and black instead of the checkered pattern image 16.

In this case, the projector 20 must additionally perform processing of projecting and sensing a solid white image. However, the processing of generating the white corrected sensing information can be omitted.

In the above-described embodiments, the projector 20 corrects image distortion based on the projection target area information and the projection area information. However, the projector 20 may correct image distortion in another way. For example, the image distortion correction section 103 may detect the peak position of the luminance value in the sensing image based on the sensing information, and correct image distortion based on the peak position.

According to this modification, since the projector 20 does not require the projection target area information, image distortion can be corrected even when the projector 20 cannot detect the four corners of the screen 10 or the like.

When the projection section 190 includes a lens shift section, the image distortion correction section may prevent occurrence of image distortion by controlling the lens shift section.

An external light influence removal section may be provided in the processing section 100, for example. When a pixel area having a luminance value equal to or greater than a specific value exists in the sensing information of the K image, the external light influence removal section may replace the luminance value of the pixel area in the GK differential image with the luminance value of the pixel area near that pixel area in the GK differential image, and store the sensing information after replacement in the storage section 160 as the sensing information of the K image.

This enables the projector 20 to perform appropriate image processing by removing partial influence of the external light 80.

The preprocessing (step S1) shown in FIG. 4 is not indispensable. The projector 20 may perform the processing after the step S2 immediately after startup.

When the projection section 190 does not have a zoom function, the image information correction section 120 may generate the 3D-LUT and the 1D-LUT by using the sensing information inside the display area instead of using the corrected sensing information.

In the above-described embodiments, the sensor 60 generates the fifth sensing information by using the K image. As a modification, the sensor 60 may generate the fifth sensing information by sensing the screen 10 onto which an image is not projected.

The positional relationship between the projection image 12 and the screen 10 is not limited to the example shown in FIG. 1. For example, the entire outer frame of the projection image 12 may be positioned either outside or inside of the outer frame of the screen 10.

The checkered pattern image 16 is not limited to the image discussed in the above-described embodiments. For example, the shape of the center image or the peripheral image is not limited to quadrilateral, but may be circular, triangular, or the like.

The invention is also effective when projecting an image onto a projection target area other than the screen 10, such as a blackboard or a whiteboard.

The above-described embodiments illustrate an example in which the image processing system is provided in the projector 20. However, the image processing system may be provided in an image display system other than the projector 20, such as a cathode ray tube (CRT). As the projector 20, a projector using a digital micromirror device (DMD) or the like may be used instead of a liquid crystal projector. DMD is a trademark of Texas Instruments, Inc. (U.S.A.).

The above-described functions of the projector 20 may be implemented by only the projector, or may be distributed over a plurality of processing devices (e.g. distribution processing by projector and PC).

In the above-described embodiments, the sensor 60 is included in the projector 20. However, the sensor 60 may be configured as a device independent of the projector 20.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. An image processing system comprising:
    a sensing section which senses an area including at least a part of a projection image projected onto a projection target area to generate sensing information;
    a projection area information generation section which generates projection area information indicating a position of the projection image in an imaging area in the sensing section based on the sensing information;
    a projection target area information generation section which generates projection target area information indicating a position of the projection target area in the imaging area based on the sensing information;
    a correction information generation section which generates correction information indicating a degree of correction for distortion of the projection image based on the projection area information and the projection target area information;

a display area information generation section which generates display area information indicating display area of the projection image in the imaging area in the case that the distortion of the projection image is supposed to have been corrected based on the projection area information and the correction information; and an environmental influence reduction section which performs processing of reducing environmental influence caused by a difference between an ideal environment and an actual environment by using information inside the display area included in the sensing information based on the sensing information and the display area information.

2. The image processing system as defined in claim 1, comprising:

a control section which controls a zoom section which adjusts a size of the projection image based on the display area information so that the projection image is projected in an area corresponding to the display area inside the projection target area at an optimum size, and generates adjustment information indicating a degree of the adjustment, wherein the environmental influence reduction section includes:

a sensing information correction section which generates corrected sensing information by determining a change in brightness of the projection image due to the adjustment based on the adjustment information, and correcting information inside the display area included in the sensing information based on the change in brightness; and an image information correction section which corrects image information based on the corrected sensing information so that a color and brightness of the projection image become ideal.

3. The image processing system as defined in claim 2, wherein the image information correction section includes:

a color correction section which corrects the image information based on ideal color information indicating an ideal color and the corrected sensing information so that the projection image is projected in the ideal color; and a brightness correction section which corrects the image information corrected by the color correction section based on ideal brightness information indicating ideal brightness and the corrected sensing information so that the projection image is projected at the ideal brightness.

4. The image processing system as defined in claim 3, comprising:

a projection section which projects a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of the single-color image of red, green, blue, or black, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black; and wherein the projection area information generation section generates center area information indicating a position of the center image in the imaging area and peripheral area information indicating a position of the peripheral image in the imaging area based on the differential image, and generates the projection area information based on the center area information and the peripheral area information.

5. The image processing system as defined in claim 4, wherein the sensing information correction section generates corrected sensing information of the single-color red image, the single-color green image, the single-color blue image, and the solid black image based on the sensing information of the single-color red image, the single-color green image, the single-color blue image, and the solid black image;

wherein the color correction section corrects the image information based on the corrected sensing information of the single-color red image, the single-color green image, the single-color blue image, and the solid black image; and wherein the brightness correction section generates corrected sensing information of a solid white image based on the corrected sensing information of the single-color red image, the single-color green image, the single-color blue image, and the single-color black image, and corrects the image information corrected by the color correction section by utilizing the corrected sensing information of the solid white image.

6. The image processing system as defined in claim 4, wherein the sensing information correction section calculates an average value of image signal values of all pixels forming the display area included in the sensing information for each type of the image signal values for the sensing information of each of the single-color red image, the single-color green image, the single-color blue image, and the solid black image, and corrects the average value of each type of the image signal values based on the change in brightness to generate information indicating the average value after correction as the corrected sensing information.

7. An image processing system, comprising:

a sensing section which senses an area including at least a part of a projection image projected onto a projection target area to generate sensing information;

a projection area information generation section which generates projection area information indicating a position of the projection image in a sensing area of the sensing section based on the sensing information;

an image distortion correction section which corrects distortion of the projection image and generates correction information indicating a degree of the correction;

an environmental influence reduction section which performs processing of reducing environmental influence caused by a difference between an ideal environment and an actual environment;

a projection section which projects a single-color red image, a single-color green image, a single-color blue image, a solid black image, and a multi-color image including one of red, green, and blue and black as the projection image at different times; and a differential image generation section which generates a differential image based on sensing information of the multi-color image and sensing information of one of the single-color red image, the single-color green image, the single-color blue image, and the solid black image, wherein the multi-color image includes a center image positioned near a center of the multi-color image, a peripheral image positioned at periphery of the center image, and a background image which is part of the multi-color image other than the center and peripheral images, the center and peripheral images being black and the background image being a single color other than black, or the center and peripheral images being a single color other than black and the background image being black;

wherein the projection area information generation section generates center area information indicating a position of the center image in the sensing area and peripheral area information indicating a position of the peripheral image in the sensing area based on the differential image, and generates the projection area information based on the center area information and the peripheral area information; and wherein the environmental influence reduction section performs the processing of reducing the environmental influence by using information inside the center image included in the sensing information in a state in which the distortion is corrected based on the sensing information, the correction information, and the center area information.

8. The image processing system as defined in claim 7, wherein the projection section projects an image having an area corresponding to the multi-color image or the center image before projecting the projection image as a position confirmation image for allowing a user to confirm whether or not the area corresponding to the center image is projected onto the projection target area.

9. A projector comprising the image processing system as defined in claim 1.

10. A projector comprising the image processing system as defined in claim 7.

11. An image processing method utilizing a computer including a sensing section and a processing section,
wherein the sensing section senses an area including at least a part of a projection image projected onto a projection target area to generate sensing information;
wherein the processing section generates projection area information, the projection area information indicating a position of the projection image in an imaging area in the sensing section based on the sensing information;
wherein the processing section generates projection target area information indicating a position of the projection target area in the imaging area based on the sensing information;
wherein the processing section generates correction information indicating a degree of correction for distortion of the projection image based on the projection area information and the projection target area information;
wherein the processing section generates display area information indicating display area of the projection image in the imaging area in the case that the distortion of the projection image is supposed to have been corrected based on the projection area information and the correction information; and
wherein the processing section performs processing of reducing environmental influence caused by a difference between an ideal environment and an actual environment by using information inside the display area included in the sensing information based on the sensing information and the display area information.

* * * * *